Sept. 18, 1956

C. T. ASBURY 2,763,257

APPARATUS FOR CUTTING STONE

Filed May 23, 1952

INVENTOR
CHARLES T. ASBURY
BY Toulmin & Toulmin
ATTORNEYS

Sept. 18, 1956  C. T. ASBURY  2,763,257
APPARATUS FOR CUTTING STONE
Filed May 23, 1952  2 Sheets-Sheet 2

INVENTOR
CHARLES T. ASBURY
BY Toulmin & Toulmin
ATTORNEYS

United States Patent Office 2,763,257
Patented Sept. 18, 1956

2,763,257

APPARATUS FOR CUTTING STONE

Charles T. Asbury, Fort Lauderdale, Fla., assignor, by mesne assignments, to Fidelity Service, Inc., Fort Lauderdale, Fla., a corporation of Florida Application May 23, 1952, Serial No. 289,649

1 Claim. (Cl. 125—36)

This invention relates to a method and apparatus for cutting, and particularly to such a method and apparatus when employed in connection with the cutting of stones, both natural and artificial, and composite substances of a similar nature, such as terrazzo and the like.

In the cutting of stone and concrete, and in smoothing down of terrazzo flooring and the like, cutting elements must be employed which are hard enough to cut the stone-like material while at the same time possessing sufficient life to be economical to use. Heretofore, there has been no entirely satisfactory cutting device for this purpose.

Having the foregoing in mind, the particular object of this invention is the provision of improved method and apparatus for cutting stone, concrete, terrazzo, and like materials.

Another object is the provision of a cutter of the nature referred to which will be extremely rapid in operation and will effect a clean cutting.

Still another object is the provision of a cutter of the nature referred to which is inexpensive to construct and which will have relatively long life.

Still another object is the provision of a cutter of the type referred to which can be lubricated continuously while in use, thereby to enhance its cutting qualities and the durability thereof.

The objects of this invention are attained, in brief, by employing a holder adapted for rotary operation and from which there projects, either radially or axially, a plurality of cutting elements which are advantageously formed of twisted wires or which are made from lengths of wire cable. A cutter of this general nature is disclosed in my co-pending applications Serial Nos. 174,392 filed July 18, 1950, now Patent No. 2,676,447, and 239,806 filed July 24, 1951, which issued as Patent No. 2,663,137, December 22, 1953, and which applications disclose lawn trimming device. In experimentation with this device I have found that the novel cutter arrangement devised therefor also has particular merit for the cutting of stone and concrete and the like with certain modifications being made in the holder for the cutting elements and in the type of cutting element and arrangement thereof in the holder.

The objects referred to above and still other objects and advantages will be more apparent upon reference to the following specification taken in connection with the accompanying drawings, in which.

Figure 1:
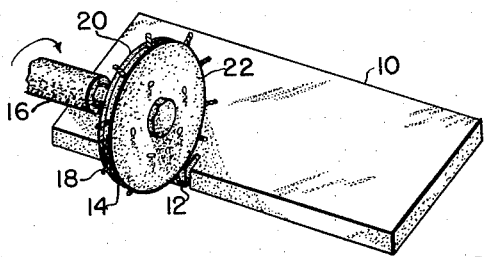
Figure 1 is a perspective view showing a cutter according to my invention being employed for cutting a piece of stone or concrete.

Referring to the drawings somewhat more in detail, in Figure 1 a block of concrete or stone is represented at 10 and there is being cut therein a groove or the like at 12 by a cutter according to the present invention and which comprises a holder 14 mounted on a shaft 16 for being driven thereby and having projecting radially from about the periphery thereof the cutting elements 18.

Figure 2:
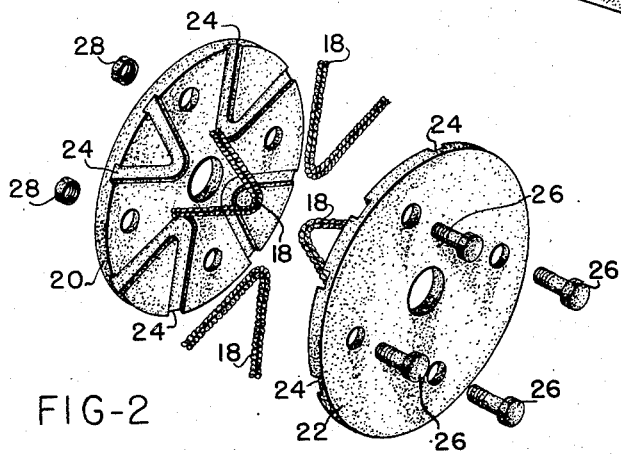
Figure 2 is an exploded perspective view showing the construction of the cutter of Figure 1.

In Figure 2 it will be observed that the holder 14 consists of a pair of plates 20 and 22 having generally V-shaped grooves 24 in their inner faces and within which grooves the generally V-shaped cutting elements 18 are mounted. A plurality of clamping bolts 26 having nuts 28 are provided for clamping the plates 20 and 22 together.

The cutting elements 18 each advantageously consist of a length of cable or wires twisted together and I have found that particularly good cutting results obtain from this arrangement. The cutting elements are sufficiently resilient that the impact thereof on the stone or concrete is cushioned whereby breaking and bending of the elements is prevented while at the same time the twisted together relation of the individual wires of the elements supports and sustains the wires thereby giving the elements sufficient stiffness to carry out the desired cutting action. The cutting is rapid and clean, and sufficient heat radiation is provided by the disclosed arrangement that no difficulty is encountered from overheating.

Figure 4:
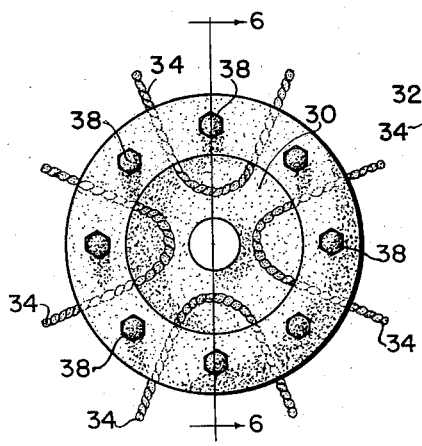
Figure 4 is a side view of a cutter of somewhat modified form.
Figure 5:
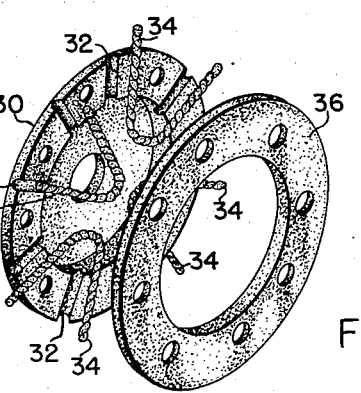
Figure 5 is an exploded perspective view of the cutter of Figure 4.
Figure 6:
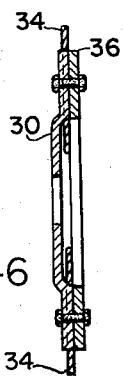
Figure 6 is a vertical sectional view indicated by line 6—6 on Figure 4.

In Figures 4 and 5 the arrangements shown consist of a back plate 30 having the radial grooves 32 formed therein adjacent the periphery for receiving the twisted wire or wire cable cutting elements 34 and which are retained in position by the clamping ring 36 adapted for being secured on plate 30 by the clamping screws 38.

In the Figures 4 and 5 arrangement, the possibility exists of supplying lubricant, such as water, to the plate 30 inside clamping ring 36 and which water will be thrown outwardly along the cutting elements to cool and lubricate the elements where they are cutting on the stone or concrete.

Figure 7:
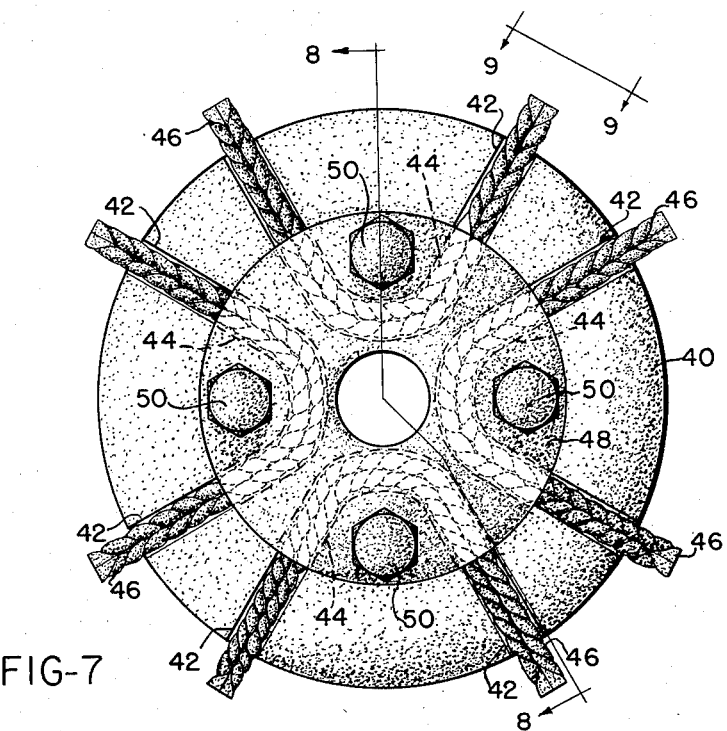
Figure 7 is a view like Figure 6 but showing still another modified form of the cutter.
Figure 8:
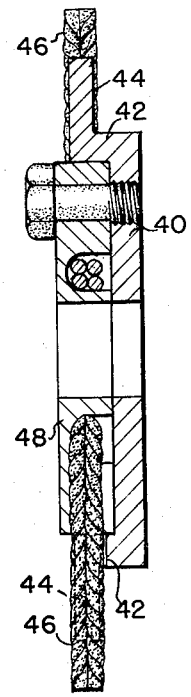
Figure 8 is a vertical sectional view indicated by line 8—8 on Figure 7.
Figure 9:
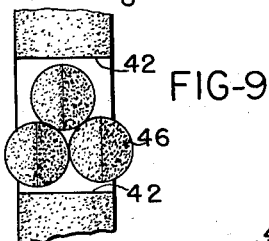
Figure 9 is a view indicated by line 9—9 on Figure 8.

In Figures 7, 8 and 9 I show one of the preferred forms which a cutter according to my invention may take. In these figures the holder consists of a large plate 40 having a plurality of radial slots 42 therein which are interconnected in pairs at their inner ends as by the grooves indicated at 44. In these radial slots 42 and the grooves 44 are mounted the cutting elements 46 to be retained in position by a smaller clamping plate 48 secured in position by the clamping bolts 50. With the Figures 7 through 9 arrangement, the cutting elements 46 are further stiffened and supported by engagement with the side walls of the slots 42 and in this manner very heavy and severe cutting work can be accomplished. Further, the plate 40 outwardly of the periphery of the clamping plate 48 is of such thickness as to permit the plate to enter into the cut being made in the article being operated and this permits extremely rapid and heavy cutting to a substantial depth.

Figure 11:
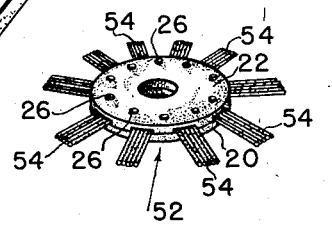
Figure 11 is a perspective view showing a cutter having a plurality of cutting elements in each group thereof.
Figure 3:
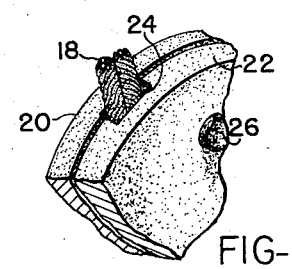
Figure 3 is a somewhat enlarged fragmentary view showing the manner in which the cutting elements are clamped in the holder.

In Figure 11 I disclose a cutter substantially like the cutter in Figures 1 through 3, except that the cutting elements are provided by a plurality of individual elements. In this figure the holder is at 52 and the groups of cutting elements at 54. By having a plurality of individual elements in each group thereof, for example 5 as illustrated, the cutting elements can be projected outwardly farther from the periphery of the holder than they can be in the Figures 1 through 3 modification and still remain stiff enough to carry out adequate cutting operations.

Figure 12:
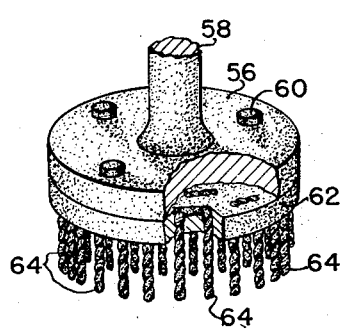
Figure 12 is a perspective view showing an arrangement of the cutter that can be employed for cutting down and polishing flat surfaces, such as floors.
Figure 10:
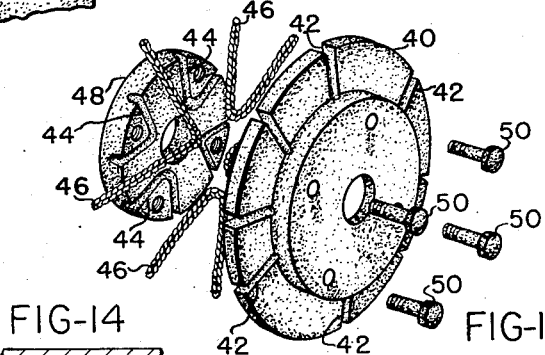
Figure 10 is an exploded perspective view of the cutter of Figures 7 through 9.
Figure 13:
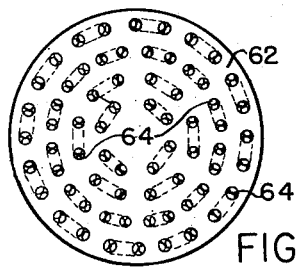
Figure 13 is a view looking up from the bottom of the cutter in Figure 12.
Figure 14:
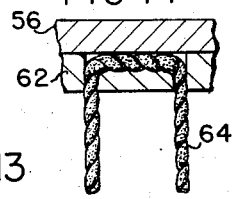
Figure 14 is a fragmentary sectional view showing how a cutting element is mounted in the holder of the cutter of Figures 12 and 13.

The cutter of my invention can be also employed for smoothing concrete, as for floors, or for trimming down or polishing, at least to a rough state, terrazzo floors and the like by an arrangement such as I show in Figures 12 through 14. In these figures the holder consists of a member 56 adapted for connection with a shaft 58 for rotation on a vertical axis. Attached to member 56 as by bolts 60 is a plate 62 adapted for receiving the inverted U-shaped cutting elements 64 which have their ends projecting axially downwardly from plate 62. The cutting action of the cutter which I show in Figures 12 through 14 is similar to that of the other cutters, except that with a plurality of cutting elements arranged with their ends in co-planar alignment a flattening or smoothing effect is had. The same rapid cutting action described takes place, however, by driving the cutter of Figures 12 through 14 at a suitable speed and moving it about over a floor or the like and good smoothing action will be had and, if suitably small cutting elements are employed, the cutter will even carry out an initial polishing action.

It will be understood that this invention is susceptible to modification in order to adapt it to different usages and conditions and, accordingly, it is desired to comprehend such modifications within this invention as may fall within the scope of the appended claim.

I claim:

A circular cutter for abrading stone and cement comprising a pair of circular plates, said plates being adapted to be placed face-to-face and secured together to provide a unitary wheel, each of said plates having a plurality of V-shaped grooves on their inner faces and complementing each other, means for connecting said wheel to a shaft for rotating the same, means for clamping said plates together to form said unitary wheel, each of said plates having a plurality of V-shaped grooves therein, said grooves extending radially from the center of said plates and having the lower closed V-shaped groove portion adjacent the center portion of said plates, a plurality of coplanar V-shaped abrading elements nestingly arranged in each of said V-shaped grooves, the uppermost leg portions of said V-shaped cutting elements extending outwardly beyond said plates, and each of said abrading elements consisting of a plurality of lengths of twisted stiff cable wire of sufficient hardness and resiliency to withstand the impact thereof on stone and concrete without breaking or bending of said elements.

References Cited in the file of this patent

UNITED STATES PATENTS

| | | |
|---|---|---|
| 661,650 | Thurston | Nov. 13, 1900 |
| 1,697,116 | Hayward | Jan. 1, 1929 |
| 1,730,756 | Brown | Oct. 8, 1929 |
| 1,970,302 | Gerhardt | Aug. 14, 1934 |
| 2,083,369 | Greene | June 8, 1937 |
| 2,150,381 | Lansing | Mar. 14, 1939 |
| 2,158,629 | Lansing | May 16, 1939 |
| 2,174,385 | Holmes | Sept. 26, 1939 |
| 2,480,877 | Peterson | Sept. 6, 1949 |
| 2,663,137 | Asbury | Dec. 22, 1953 |